United States Patent Office 3,439,376
Patented Apr. 22, 1969

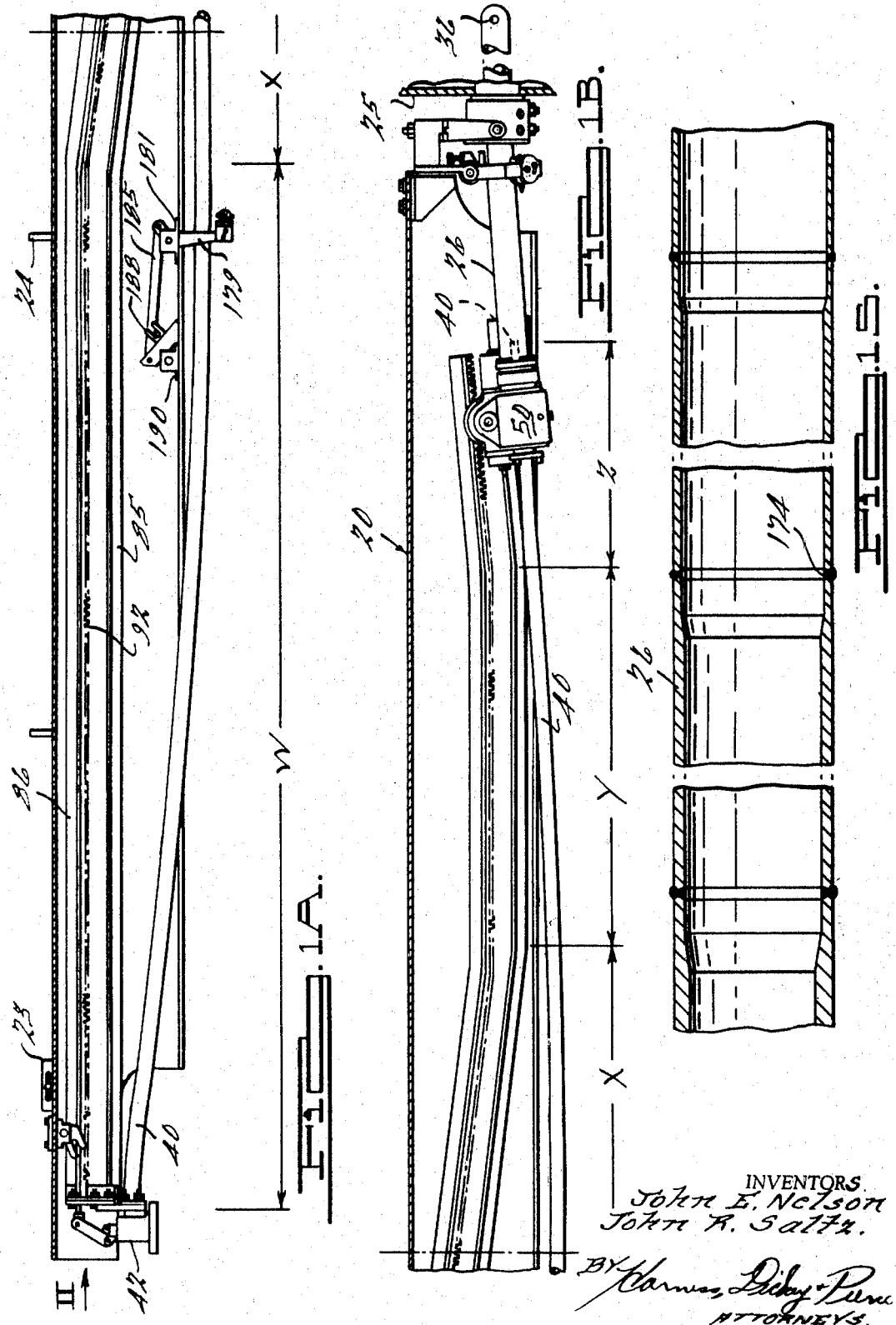

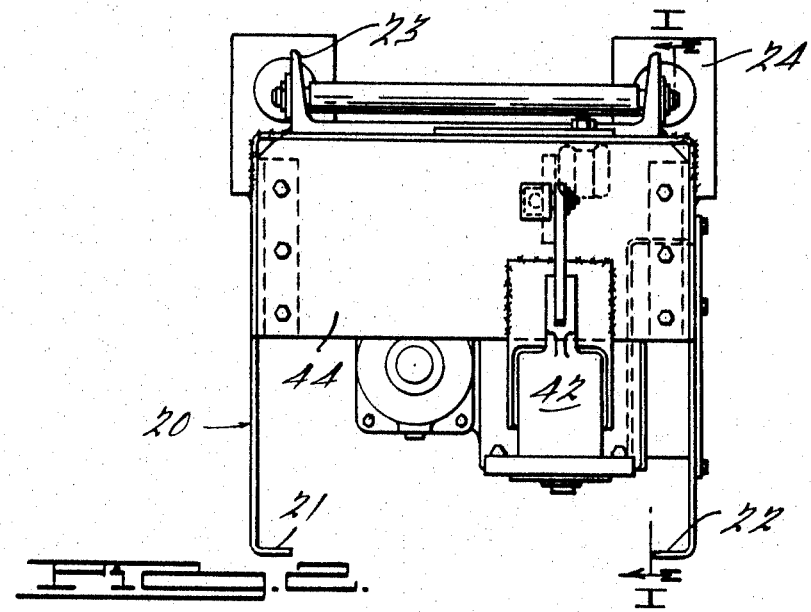
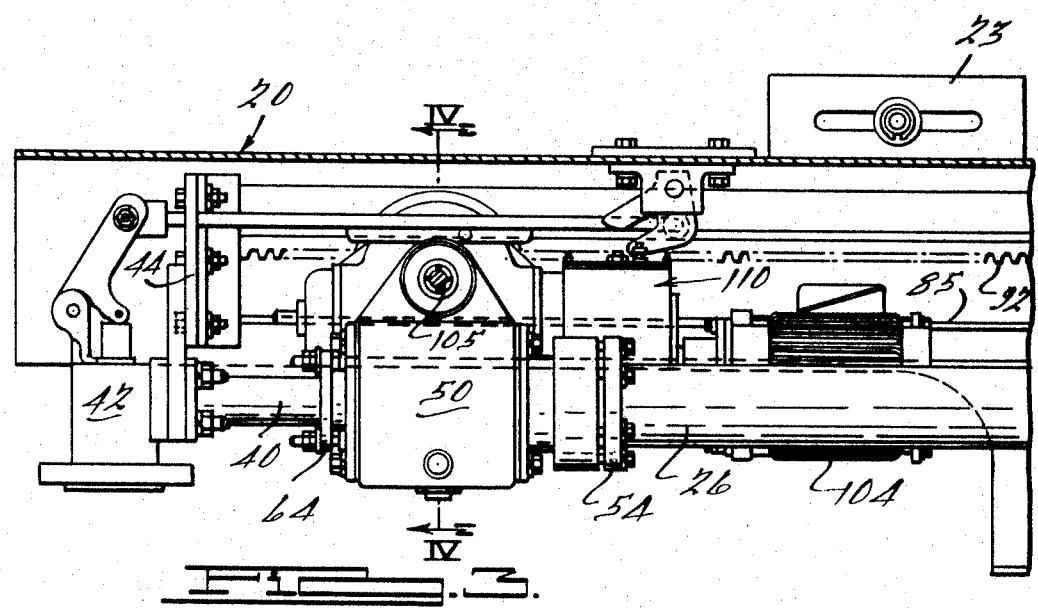

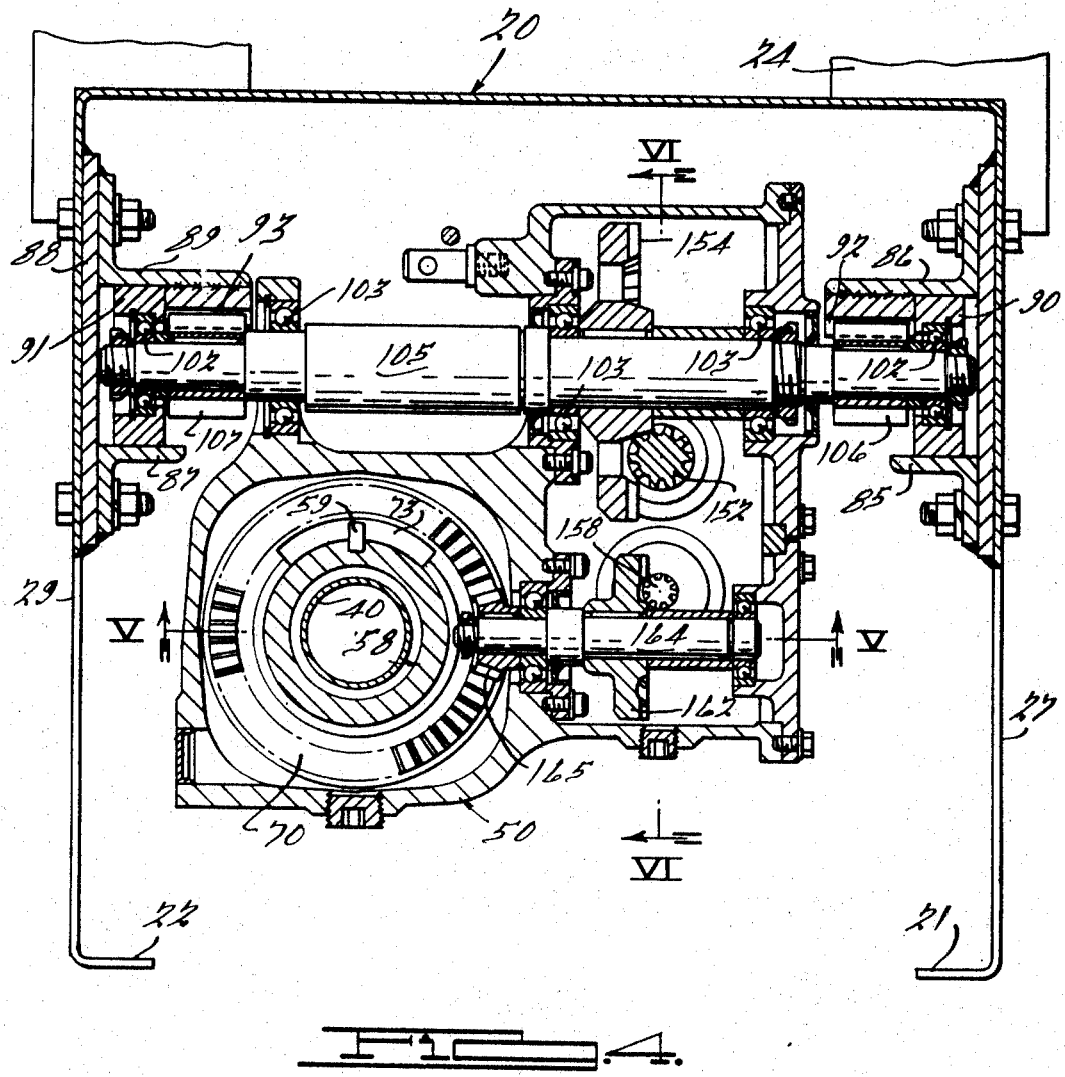

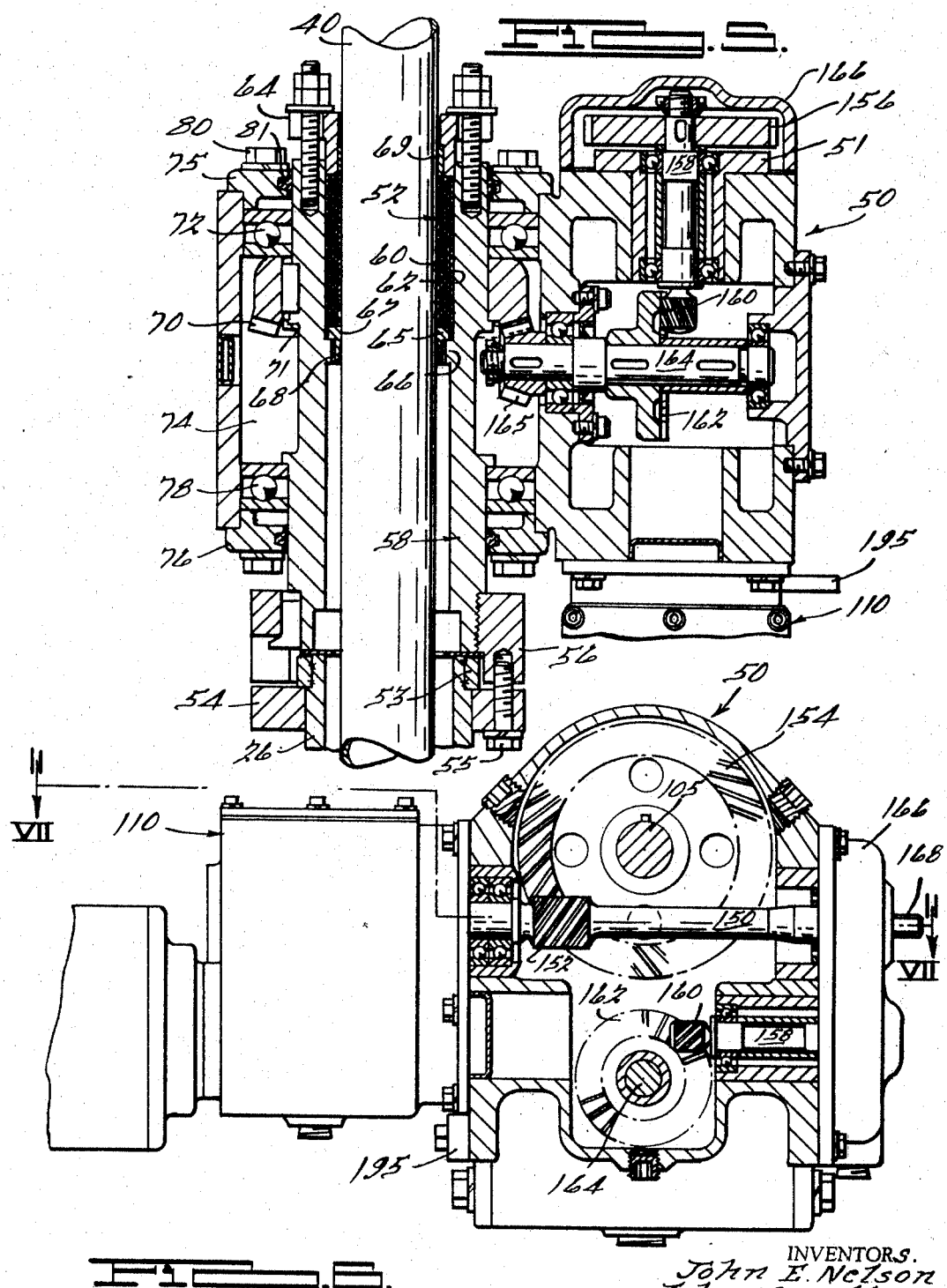

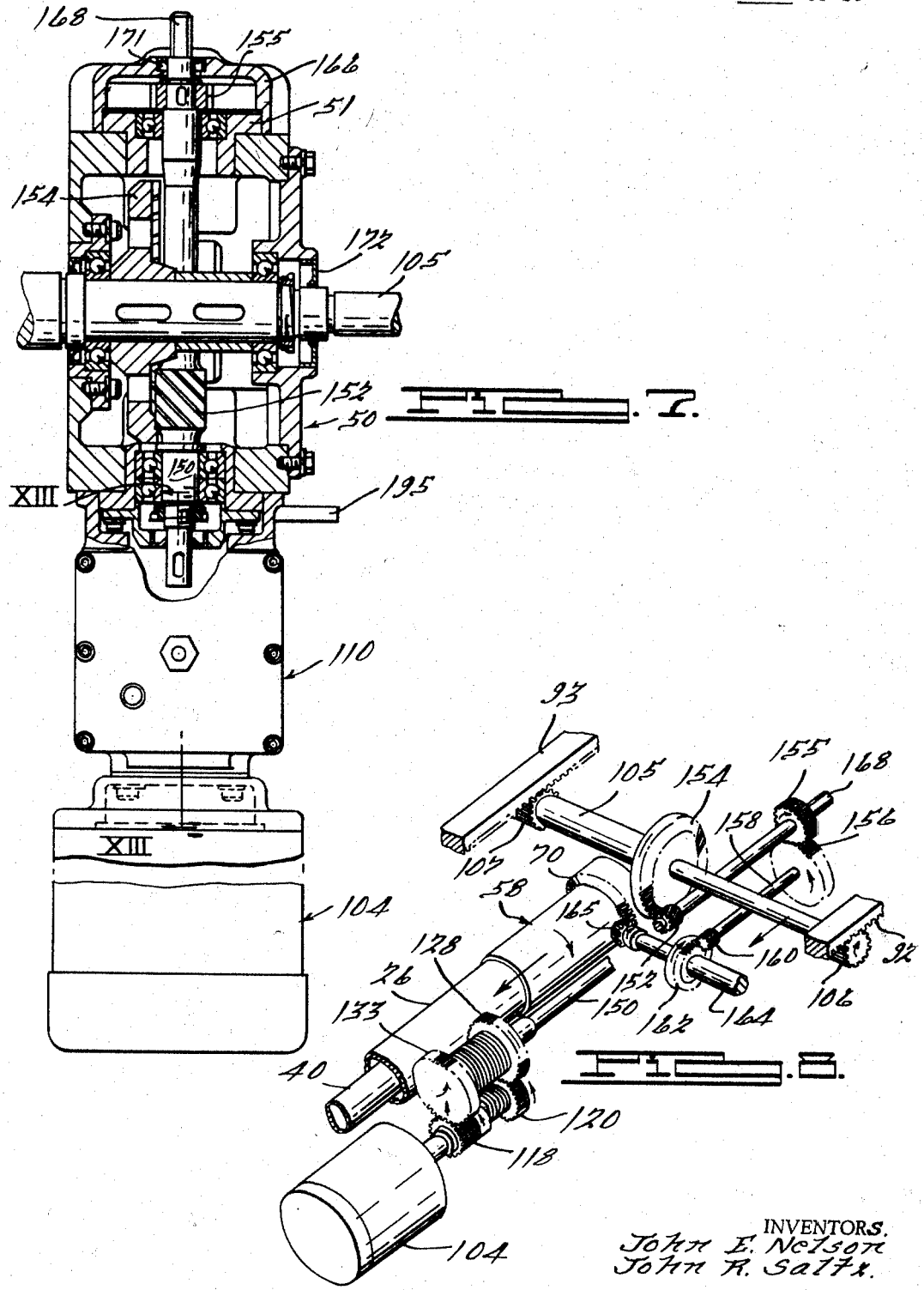

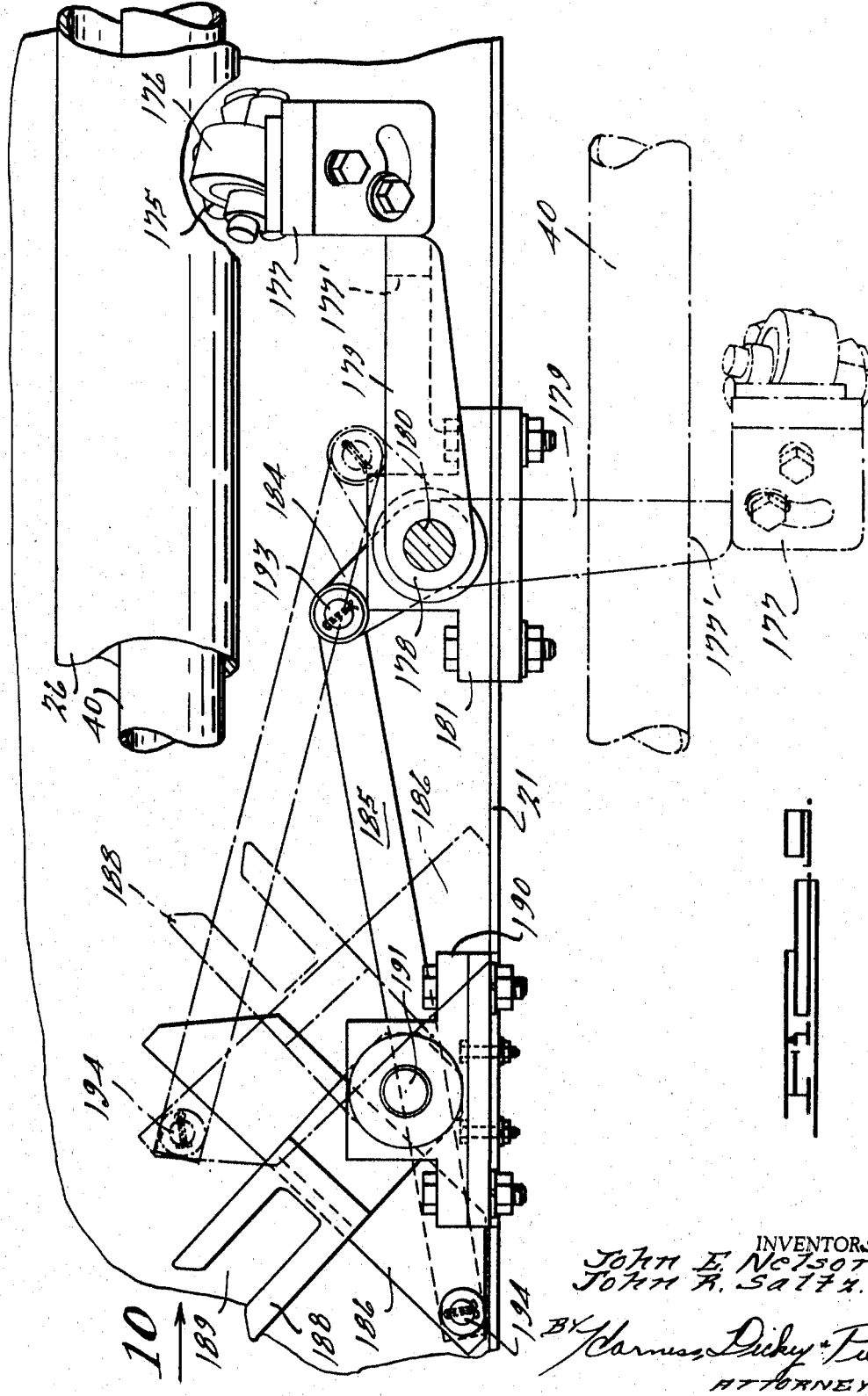

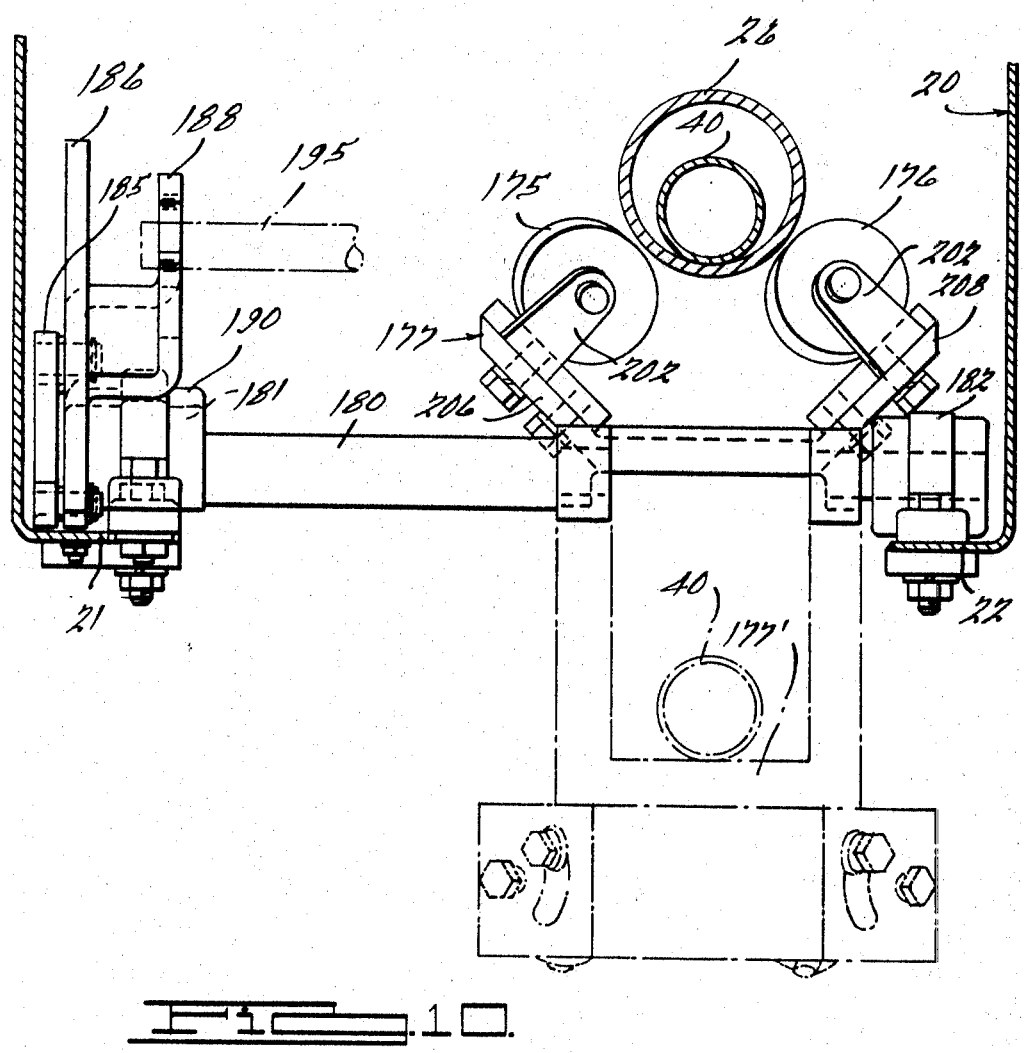

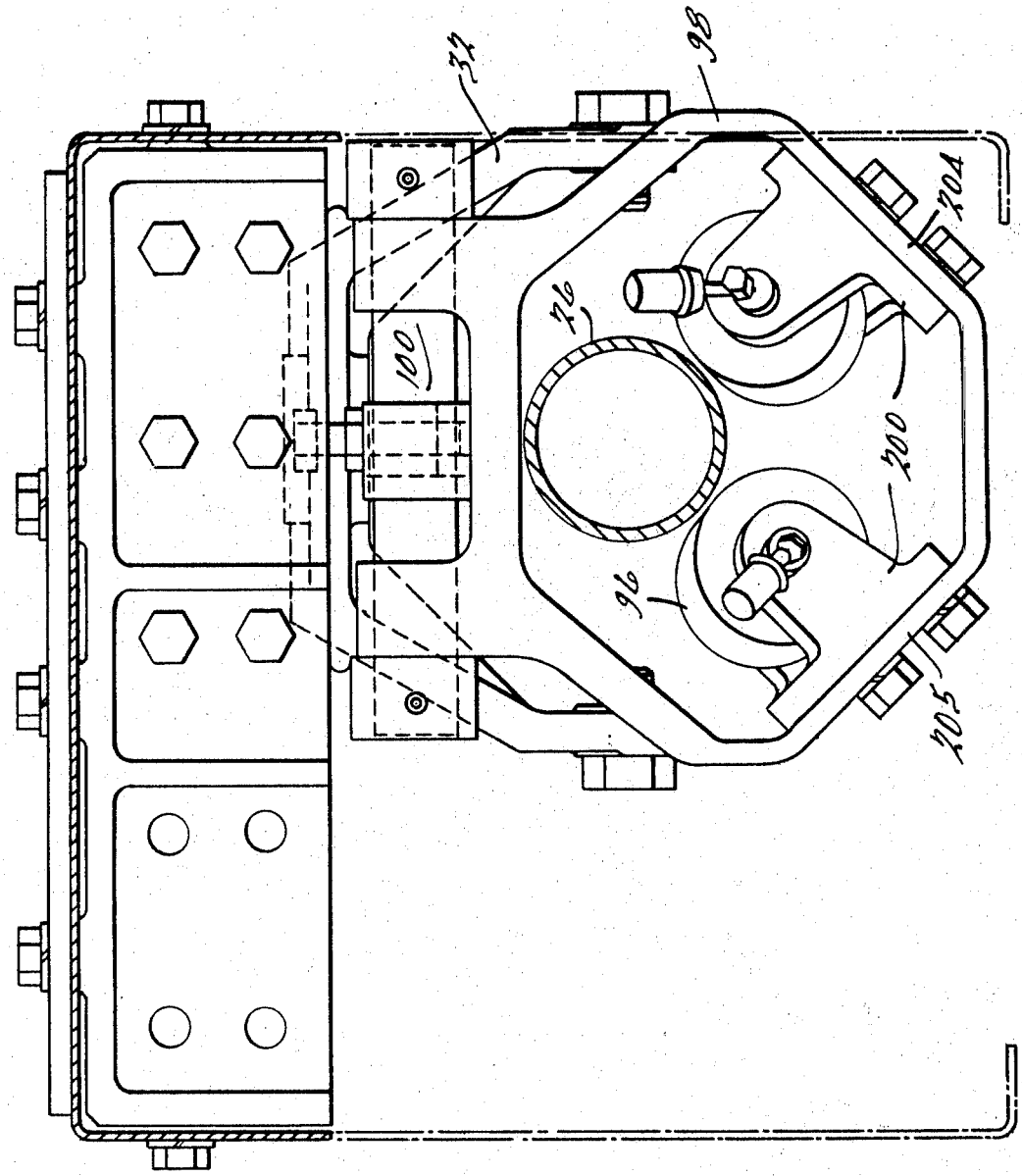

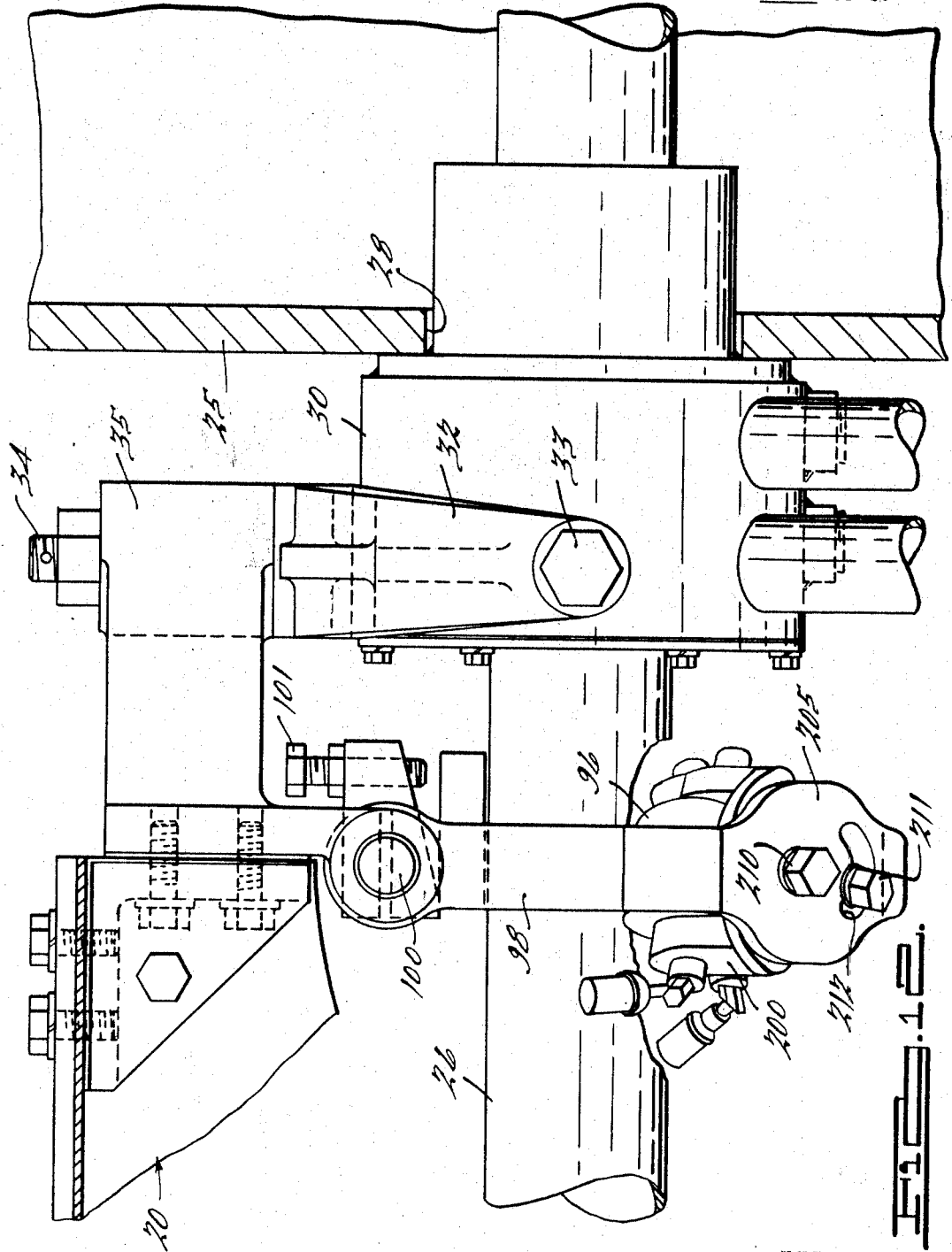

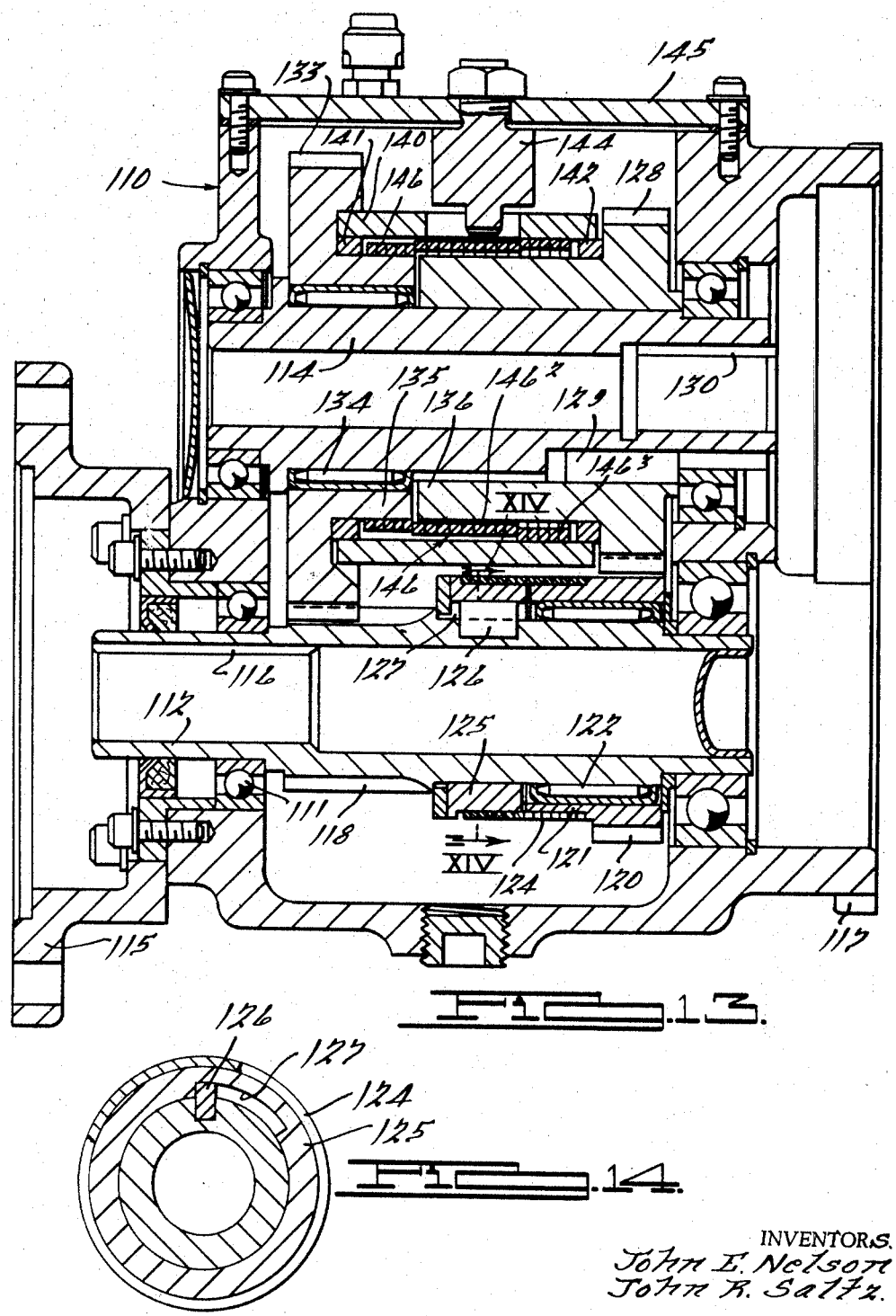

3,439,376
LONG RETRACTING SOOT BLOWER
John E. Nelson and John R. Saltz, Lancaster, Ohio, assignors to Diamond Power Specialty Corporation, Lancaster, Ohio, a corporation of Ohio
Filed Sept. 9, 1965, Ser. No. 486,121
Int. Cl. F23j 3/02
U.S. Cl. 15—317                                                13 Claims

ABSTRACT OF THE DISCLOSURE

The lance tube of a long retracting soot blower is supported in a straight box beam of rectangular cross section between a front roller assembly and a traveling motor-driven carriage at the rear of the lance tube. The carriage has drive pinions which walk along racks secured to the inner sidewalls of the beam, the racks and supporting rails parallel thereto and which are also secured to the inner sidewalls of the beam being so contoured as to displace the carriage and the rear end of the lance tube connected thereto vertically downwardly with relation to the front roller assembly, as the lance tube is projected, and vice versa, to an extent which offsets the tendency of the free end of the lance tube to sag under the force of gravity as it is projected into the boiler. The carriage is driven through transmission means which includes irreversible pitch gearing, so that the lance tube cannot be projected by the pressure of the blowing medium. The lance tube is slidably overfitted upon a stationary feed tube which at its forward end is supported only by its interfitted engagement with the lance tube. In order to prevent sagging of the lance tube and feed tube when the lance tube is retracted, and also prevent undue sagging of the feed tube when the lance tube is projected, an intermediate supporting roller assembly is provided which is vertically shiftable to two different supporting positions. During projecting movement of the lance tube the carriage, upon reaching such intermediate position, displaces the intermediate support to a lowered position and as the carriage and the lance continue forwardly toward the fully projected position, downward sagging of the now exposed feed tube is limited by the intermediate support rollers in their lowered position. Such lowered supporting position permits a desirable but limited degree of sagging of the feed tube and maintains alignment of the forward portion of the feed tube with the stuffing box and lance tube. When the lance and carriage are retracted, the carriage, after passing the intermediate support position, shifts the intermediate support assembly to a higher supporting position wherein it supports the lance tube, and thereby also the feed tube contained therein, in a straight position. The driving pinions and supporting rollers of the carriage are all coaxial, permitting the carriage and the attached end of the lance tube to rock about a transverse axis.

---

This invention relates to soot blowers of the long retracting type. Principal objects of the invention may be summarized as to achieve longer travel of the lance tube, longer life, and more reliable performance in proportion to the size, weight and cost of the blower.

Another object is to provide an improved blower which is highly flexible in its adaptability to different conditions of operation.

Another object is to provide improved means for supporting and guiding the lance tube, for preventing unwanted sagging of the lance tube and feed tube, maintaining proper alignment of the parts, and reducing wear and maintenance.

A further object is to provide an improved long travel soot blower having sag counteracting characteristics achieved by a novel structural arrangement including dual contoured rails mounted in the side webs of a straight beam structure of inverted channel form, and wherein a high degree of stiffness is attained in proportion to the weight of the assembly.

Other objects and advantages will become apparent upon consideration of the present disclosure in its entirety.

In the drawings:

FIGURES 1A and 1B are a composite longitudinal vertical sectional elevational view of the rear and forward portions respectively of a soot blower embodying the present invention, taken substantially as indicated by the line and arrows I—I of FIG. 2;

FIG. 2 is a rear end elevation of the blower, viewing the same as indicated by the arrow II of FIG. 1A;

FIG. 3 is a longitudinal sectional elevational view of the rear portion of the blower with the carriage retracted, on a larger scale than FIG. 1A, taken substantially on the line I—I of FIG. 2 and looking in the direction of the arrows;

FIG. 4 is a vertical cross section of the beam and carriage, taken substantially on the line IV—IV of FIG. 3 and looking in the direction of the arrows;

FIG. 5 is a sectional plan view taken substantially as indicated by the line and arrows V—V of FIG. 4 and looking in the direction of the arrows;

FIG. 6 is a longitudinal vertical sectional elevational view taken substantially as indicated by the line and arrows VI—VI of FIG. 4 and looking in the direction of the arrows;

FIG. 7 is a sectional plan view taken substantially as indicated by the line and arrows VII—VII of FIG. 6 and looking in the direction of the arrows;

FIG. 8 is a phantom schematic perspective view of the principal operative components of the carriage and transmission mechanism;

FIG. 9 is a side elevational view of the swingable auxiliary support assembly for the lance and feed tube, shown on a larger scale than in FIG. 1A and illustrating its two operative positions;

FIG. 10 is a vertical cross sectional view taken substantially as indicated by the arrows 10 in FIGURE 9;

FIG. 11 is a cross sectional view taken substantially on the line XI—XI of FIG. 1B and looking in the direction of the arrows;

FIG. 12 is a longitudinal sectional elevational view of the forward portion of the blower;

FIG. 13 is a longitudinal vertical sectional view of the transmission, taken substantially as indicated by the line and arrows XIII—XIII of FIG. 7;

FIG. 14 is a sectional detail taken substantially on the line XIV—XIV of FIG. 13 and looking in the direction of the arrows; and FIG. 15 is a fragmentary longitudinal diametric section of the lance tube.

Referring now to the drawing, reference character 20 designates generally the channel-type main beam structure of my improved blower, the cross sectional configuration of which is best shown in FIG. 4. As there shown, the beam 20 is formed with straight vertical side panels, a flat top, and with inturned bottom flanges 21, 22. As shown in FIGS. 1A and 1B, which are intended to be read in horizontally aligned relation located to the left and right of each other respectively, the beam structure is straight, and is intended to be installed in horizontal position and to be supported in any suitable or conventional manner as by the hangers and bracket means 23, 24, these parts serving to suspend the blower from suitable structural steel supports or the like (not shown) in the usual or any desired manner. The beam, when so supported, extends perpendicularly from the boiler wall 25 in such manner that the lance tube 26 is projectable into the boiler setting through the opening 28, to the projected position shown in FIGS. 1A and 1B, and is retractable to a protected position, in which the principal parts are shown in full lines in FIGS. 3, 9 and 12. The opening 28 in the boiler setting is guarded by a wallbox 30 through which the lance tube is slidable. The forward end of the beam assembly is connected to the wallbox for limited universal movement as by means of the inverted yoke 32, the lower bifurcated arms of which are connected to opposite sides of the wallbox by trunnion bearing screws 33, while a central upwardly extending stem portion 34 of the yoke projects through and is turnable about a vertical axis in a nose portion 35 fastened to the forward end of the beam 20.

The lance tube 26, which is provided with one or more nozzle openings as 36 at its forward end, is telescopically overfitted upon and slidable with relation to the feed tube 40 which is secured at and supplied with blowing medium from the rear extremity of the beam structure, at which location it is coupled to the blow valve 42, valve 42 and the rear end of the feed tube being fixed to and communicating with one another through an aperture in a bracket plate 44 rigidly transversely supported in the beam.

The rear end of the lance tube is secured to and actuatable by a carriage generally designated 50. A substantially sealed relationship between the rear end of the lance tube and the feed tube 40 is maintained by a packing assembly generally designated 52 and which is best shown in FIGURE 5. The rear end of the lance tube 26 carries rigidly attached thereto a radially projecting flange-forming abutment ring 53, which is held by a clamping ring 54 secured by bolts 55 to a flange ring 56 rigidly attached and keyed to turn as a unit with a hollow spindle or hub 58. Hub 58 houses the packing assembly 52 and is rotatably and longitudinally drivable by the carriage 50 to cause the lance tube to be projected and retracted, and rotatively driven. During such travel the packing material 60 slides over the surface of the feed tube 40.

The packing material 60 is retained in a counterbore 62 in the rear end of the hollow spindle 58 and is compressible therein by an adjustable gland 64 in a manner which will be recognized as conventional. At its ends the packing material is trapped between the axially adjustable gland 64 and a forward abutment ring 65. The abutment ring 65 is formed of a suitable bearing metal and bears against an integral internal flange 66 in the hollow spindle 58, such flange defining the forward wall of the counterbore 62. The ring 65 is of an outside diameter substantially smaller than the internal diameter of counterbore 62, so that the ring 65 can shift radially in the counterbore to a limited extent. Such radial or lateral shiftability is limited so that the packing material will not be unduly compressed or destroyed, but is sufficient to permit the ring 65 and the adjacent portion of the packing to yield and follow the feed tube during a certain amount of bending, tilting and axial misalignment between the feed tube and hub. The rear axial portion of ring 65 is fitted on the feed tube with a relatively accurate slidable fit, in the area designated 67, while the forwardly projecting portion is internally relieved with a graduatedly increasing conically flared internal wall extending to the forward axial end of the ring, such flared internal wall being designated 68. A bearing ring 69 of relatively incompressible material such as bronze is interposed between the gland and the feed tube 40 and slidably fitted on the latter at the rear end of the packing assembly but is not radially shiftable.

Rotary drive is imparted to the hub 58 through a bevel gear 70 mounted on the exterior thereof. The driving key 59 for gear 70 is fast in spindle 58, but fitted in a 90° slot 73 in the gear 70 which permits independent rotation of these parts to such angular extent. Gear 70 is trapped between a flange 71 on the hub and an antifriction thrust bearing 72 retained in a cylindrical housing portion 74 of the carriage 50 by an annular cap 75. A similar cap 76 at the other end of the housing portion 74 traps between itself and another flange 77 on the hub an oppositely acting thrust bearing 78. The caps 75, 76 are held by suitable screws 80 and provided with lubricant sealing means as 81 housed in internal grooves therein and wipingly engaging the exterior of the hub 58.

The carriage assembly 50 is supported in depending position by and travels along tracks carried by and projecting inwardly from the side walls 27 and 29 of the beam 20. Each track consists of a bottom rail as 85, 87 and a top rail as 86, 89. The rails extend longitudinally of the inner walls of the beam in spaced parallel relation, each rail being defined by an angle iron structure rigidly secured as by welding and bolting to longitudinal stiffening and supporting plates as 88, which are in turn similarly secured to the inner wall of the beam structure, as shown in FIGURE 4. The left and right double rail assemblies are in parallel and transversely aligned relation with respect to one another and each pair of upper and lower rails defines in effect an inwardly opening groove or trough-like way, in which a carriage-supporting roller 90, 91 rollably fits. The inwardly extending flanges of the top rail elements 86, 89, project inwardly farther than the bottom rails 85, 87, each of such upper flanges supporting upon its undersurface a longitudinally extending rack as 92, 93.

As brought out in FIGURES 1A and 1B the track members 85, 86, 87, 89 and the rack portions 92, 93 carried by the upper track elements, are not horizontal or straight throughout the length of the beam. Commencing at the rear, and for a proportion of the length of the beam designated W, the tracks are straight, horizontal, and parallel to the top and bottom of the beam at an elevation near the top. In a successful blower constructed in accordance with the present invention and in which the travel of the lance tube is 50 feet, 6 inches, the straight horizontal section W of the track has a length of 26 feet, 4 inches. Commencing at the forward end of the horizontal section W and continuing to the forward end of the beam structure, the track portions are contoured in a manner generally similar to the contouring of the supporting rails disclosed in the copending application of Robert E. Chappell, Ser. No. 232,010, filed Oct. 22, 1962, although in the present construction the beam itself is straight. A downwardly sloping section designated X forms a forward continuation of the horizontal portion W, and the forward end of the downwardly sloping section X is connected with a portion Y forming a continuation thereof and extending along the beam near the bottom approximately horizontally to a position nearer the front, where the section Y communicates with a final upwardly sloping continuation section Z which terminates at a position corresponding to the forward limit of travel of the supporting rollers 90, 91. In the embodiment described the length of section X is 6 feet, section Y 13 feet and section Z 6 feet, although the proportioning of the sections may be varied under different conditions such as may be imposed by lance tube diameter and material.

It will be recognized that when the lance tube and carriage are retracted far enough so that the weight of the carriage and of the portion of the lance tube outside the boiler exceeds the upward component of force exerted thereupon by the weight of the portion of the lance projecting into the boiler, the rollers bear downwardly on the bottom rails 85, 87. When the lance is projected far enough to overbalance such weight, its transmitted upward component urges the carriage upwardly so that the rollers bear against the bottom surfaces of the top rails 86, 89, the clearance between the bottom and upper rails slightly exceeding the diameters of the rollers.

The construction of the wall box 30 at the forward extremity may correspond to that disclosed in De Mart Patent No. 2,803,848 and be provided with suitable means (not shown) for discharging sealing air toward the interior of the boiler around the lance tube. The supporting roller means for the lance tube differs from that disclosed in said De Mart patent, however, the rollers 95, 96 (FIGURES 11 and 12) being of cylindrical form and journaled in a cage 98 rockably suspended from above upon a transverse pivot pin 100 carried by and at the forward end of the beam structure. The rollers 95, 96 are journaled upon axes which are inclined conformably to the pitch of the helix described by a point on the lance tube during its extension and retraction. The rocking movement of the cage 98 about the transverse axis defined by the supporting pin 100 is limited by an adjustable abutment screw 101. The rollers are positioned to tend to maintain the lance tube substantially centered in the wall box. The swingability of the cage 98 about the pin 100 permits the rollers to assume positions as close as possible to parallelism and line contact with the surface of the lance tube during its normal traveling movement between its extreme positions despite changes in the angular relationship between the roller-engaged portion of the lance tube and the horizontal due to bowing of the lance tube under gravitational forces. The lance tube is thereby prevented from running along the edge of the roller and the loading and wear are greatly reduced. The swingability of the cage also permits the rollers to move longitudinally when the lance tube moves axially without rotating, as it does for a slight distance at the end of its travel due to the lost motion mounting of gear 70 on hub 58. Such lost motion establishes different helical blowing paths during the projecting and retracting movements of the lance tube, as more particularly brought out in the U.S. patent to Andersson, No. 2,760,222. At such times the cage 98 swings toward the front or rear so that the lance tube is not dragged upon the rollers 95, 96. Such straight travel is short, and as the lance tube continues rearwardly, it commences to rotate and such rotation of the lance tube rotates the rollers 95, 96. Due to their cylindrical shape and the centering effect which is also augmented by gravity, the cage then swings down toward the vertical position as the rollers rotate, virtually all sliding friction being thus eliminated.

It will be noted that the entire support for the carriage 50 and the rear end of the lance tube is supplied by the aligned rollers 90 and 91, so that the carriage and the rear end of the lance tube can rock in a vertical plane about the transverse horizontal axis of the roller shaft 105. The rollers 90, 91 are freely journaled upon antifriction bearings at the extremities of the shaft. The shaft in turn is journaled in the carriage frame as in antifriction bearings 103. The shaft is rotatively driven through suitable transmission mechanism presently to be described and contained in the fully enclosed casing of the carriage 50 by power derived from a suitable driving motor 104 which is also secured to and travels with the carriage. A pair of pinions 106, 107 are also carried by shaft 105, the pinions being secured to the shaft and one mounted adjacent to each of the rollers 90, 91, pinion 106 meshing with rack 92, pinion 107 meshing with rack 93 so that when shaft 105 is rotated, the pinions drive the carriage longitudinally along the rails.

The motor 104 is attached to and carried by the case of a transmission assembly, generally designated 110, which is in turn attached to and supported by the main carriage body 50, so that the carriage, transmission and motor constitute and travel as a unit.

The motor is reversible to reverse the directions of travel and of rotation of the lance at each end of its travel and the transmission 110 is so constructed that it transmits power at different speed ratios when operated in the forward and reverse directions, such change in the driving ratio being effected automatically in response to reversal of the direction of drive. The construction of the transmission corresponds to the disclosure of Chappell et al., application Ser. No. 397,475, filed Sept. 18, 1964.

The transmission housing supports in suitable bearings 111 vertically spaced parallel input and output shafts 112, 114 respectively. At its forward end, the housing is provided with a flange 115 which serves as a support for the reversible electric motor 104, while at its rear end the housing is provided with flange portions as 117 for bolting the transmission to the carriage 50. The driving connection from the motor shaft to the transmission input shaft 112 is effected through internal splines 116 in the shaft, which is hollow. A pinion 118 is fast upon shaft 112 and may be integral therewith, as shown. Shaft 112 also supports a larger gear 120 journaled thereon upon needle bearings 122. Gear 120 is drivable by shaft 112 in one direction only, being connected to the shaft by an overrunning clutch of the coil spring type.

The spring 124 of the overrunning clutch bridges and provides a one-way driving connection in the known manner, between the abutting colinear cylindrical surfaces comprised by a hub portion 121 of gear 120 and adjacent cylindrical sleeve 125 carried by shaft 112. Clutch hub 125 is drivable by but limitedly clockable with respect to shaft 112, for a purpose which will be discussed hereinafter. The driving key 126 for hub 125 is fast in shaft 112 and projects into a key slot 127 in the internal wall of hub 125, slot 127 being 60° in peripheral length. The spring 124 is wrapped in a direction such that, due to its dragging fit upon both of the hubs 121, 125, it is frictionally contracted by wrapping action when shaft 112 is rotated counterclockwise (as viewed from the left in FIGURE 11) by the motor so that at such times gear 120 is effective to drive a gear 128 which is secured to output shaft 114 by key 129.

The power output from shaft 114 is connected by the internal splines 130 to the shaft 150 which extends into and constitutes the power input shaft to the carriage per se. In the illustrated arrangement the just described drive through the gears 120, 128 constitutes the forward drive for projecting the lance tube. In typical soot blower applications, the forward traverse is desirably more rapid than the reverse or retracting movement and the drive through these gears is more rapid than the reverse drive, due to the indicated size ratios of the gears.

Reverse driving gear 118 meshes with a gear 133 which is journaled on shaft 114 on needle bearings 134. Gear 133 has at one end an integral hub portion 135, the cylindrical external surface of which abuts and is colinear with the surface of a hub portion 136 integral with gear 128. Concentrically surrounding and out-spaced from the hub portions 135, 136, is a cylindrical sleeve 140 positioned at its ends by bearing collars 141, 142 mounted on the hub portions 135, 136 respectively. Sleeve 140 is keyed against rotation by a lock pin 144 rigidly carried by the cover portion 145 of the transmission housing. The internal diameter of the sleeve 140 exceeds the radial thickness of the one-way clutch spring 146 which bridges the hub portions 135, 136. When the spring 146 is releaxed, its left end portion 146' has a dragging friction fit on hub 135. At such time the intermediate portion $146^2$ which overlies hub 136 and which is somewhat greater in diameter than portion 146' does not frictionally engage the hub 136, while the extreme right end portion $146^3$ which is slightly greater in diameter than section $146^2$, has a friction dragging fit upon the cylindrical internal surface of sleeve 140.

The direction of wrapping of spring 146 is such that when gear 133 is driven counterclockwise, in response to clockwise rotation of shaft 112, the frictional drag fit of the two spring ends 146', $146^3$ is in a direction to wrap the spring, contracting it radially to cause its central portion $146^2$ to grip hubs 135, 136, counterclockwise rotation thereby being imparted to the output shaft 114 and carriage shaft 150 for reverse or retracting drive.

During the forward drive, gear 128 is driven in a clockwise direction more rapidly than gear 133. If the spring 146 were in engagement with hub 136, this would cause the one-way clutching effect of spring 146 to lock up the transmission by locking gear 128 to gear 133. It will be seen however that at such times gear 133, being driven in a clockwise direction, keeps the central spring portion 146² clear of hub 136 due to the expanding effect on spring 146 resulting from the engagement of part 146³ in sleeve 140, hub 135 then slipping in spring portion 146'. During reverse drive, clockwise rotation of shaft 112 and hub 125 releases the drive through spring 124, which accordingly slips, while the drive through gear 133 and hub 135 contracts the spring 146 to transmit a reverse drive through portions 146', 146² of spring 146, gear 128, and output shaft 114.

The lost motion provided by the peripheral elongation of keyway 127 insures proper release of clutch spring 146. After the transmission has been driven in reverse and then stopped, it may still be under load and/or friction may tend to maintain firm gripping engagement between spring 146 and hub portions 135, 136, so that the reverse drive train is still effectively engaged. If the input is then reversed and power is applied to the shaft 112 to rotate it forwardly, however, no drive will be imparted to clutch hub 125 until, due to the lost motion at keyway 127, substantial rotation of gear 123 has occurred in a direction tending to unwind and release the spring 146. Release of spring 146 is thus insured before torque can be transmitted through the forward train. This arrangement effectively prevents unwanted lockup which might result from simultaneous engagement of both clutch springs.

An intermediate portion of shaft 150 carries a cylindrical helical gear 152 meshing with the spiral teeth of a face gear 154 fast on shaft 105. The ratio of these gears is preferably such as to be self-locking, so that a drive cannot be transmitted from gear 154 to gear 152. In event of a loss of power to the driving motor or other failure of the driving mechanism the lance tube is thus locked against movement into the boiler.

Shaft 150 projects forwardly beyond the front wall 51 of the carriage housing and carries fast upon its projecting extremity outside the housing, a spur gear 155 meshing with a gear 156 fast on a shaft 158 which also extends through the front wall 51 and into the carriage where it carries a pinion 160 which drives a face gear 162 fast on transverse shaft 164. Shaft 164 extends to a position adjacent hub 58 where it carries a bevel gear 165 meshing with bevel gear 70 on the hub 58.

The gears 155, 156 are normally protected by a removable cover 166, and the gears 155, 156 are preferably secured to their respective shafts 150, 158 in a readily removable manner permitting these gears to be changed to alter the ratio of the drive to the lance tube when desired. The shaft 150 also preferably extends through and beyond the cover 166 and is provided outside the cover with a squared end portion 168, so that the shaft may be cranked by hand or turned by a temporarily applied emergency driving motor so as to provide for emergency operation in event of power failure.

It will be observed that the described arrangement provides for both rotary and longitudinal drive of the lance tube through a completely self-contained and enclosed transmission and driving system and that the housings can be charged with lubricant and effectively sealed with lubricant retainers, as indicated at 81, 171 and 172, thereby effectively protecting the parts against contamination and undue wear.

In order to afford maximum stiffness in proportion to its weight and maximum resistance to deflection, the lance tube is preferably formed of graduated thickness, its outer wall being straight and cylindrical, while its thickness is reduced toward its outer end by forming it of sections of progressively increasing internal diameter, these sections being end welded together, as indicated at 174.

In order to prevent the lance tube and the interfitted feed tube 40, which extends forwardly inside the lance tube to a position near the front end of the beam, from sagging unduly, we preferably provide an intermediate support mechanism so constructed as to effectively prevent unwanted sagging of the tubes or dropout of the feed tube while nevertheless supporting the tubes at differing elevations which take into account the vertical displacement of the carriage and tubes which results from the contouring of the rails in the manner previously described.

When the lance tube is fully retracted, the auxiliary support mechanism is so arranged as to maintain a pair of rollers 175, 176 under the lance tube in an elevated position, as shown in full lines in FIGS. 9 and 10, to hold the tubes against sagging and substantially straight. The rollers 175, 176 are journaled in a cradle 177 upon axes which are tilted conformably to the pitch of the helix of lance tube travel, so that the cylindrical surfaces of the rollers may turn freely during travel of the lance tube. As the carriage and lance move forwardly from the retracted position of FIG. 3 through that portion of the travel corresponding to section W during which support is required and prior to the downward movement of the carriage along sloping sections X which would exert an undesirable load upon the rollers and their supporting structure, the rollers 175, 176 remain in the raised position. Before the carriage reaches the downwardly sloping section X, the rollers and their supporting mechanism are automatically vertically downwardly displaced so that during subsequent forward travel of the lance tube, they do not interfere with a desired amount of downward displacement of the feed tube. Such downward displacement of the auxiliary support mechanism and rollers also prevents interference with movement of the carriage, which then proceeds forwardly to the position shown in FIGURE 1B, at which the lance tube is fully projected. As such position is approached, the central portion of the feed tube tends to sag under gravity until it again contacts the cradle 177 in the downwardly displaced position of the latter. In its lowered position a transverse supporting portion 177' of the cradle 177 limits downward sagging of the feed tube, the carriage and lance tube then being forward and to the right of the auxiliary supporting mechanism as the parts are viewed in FIGS. 1A, 1B and 9.

The cradle 177 is carried by and at the end of an offset arm structure 179, the side arm or throw portions of which are attached to hub portions 178 fast upon coaxial shaft portions 180, 180' journaled in brackets 181, 182 carried by the bottom flanges 21, 22 of the beam 20. An arm 184 fast upon one end of shaft 180 adjacent the left inner wall of the beam is connected by a link 185 to an arm 186 secured to a yoke 188 supported for rocking movement upon top of the flange 21 at a position spaced to the rear of bracket 181, in a bracket 190. Arm 186 is rockably supported by a shaft 191 and forms a rigid assembly with yoke 188, members 186, 188 being rockable with their supporting shaft 191 in the bracket 190. The link 185 is connected to the arms 184, 186 by pivot pins 193, 194, respectively. The arm 186 limits rocking movement of the yoke 188 by engaging the top surface of flange 21, and the parts are so proportioned and positioned that when the yoke is swung to the left or counterclockwise, as viewed in FIGURE 9, to the limit of its travel, which is the position shown in full lines in that view, the line of connection between pivot pins 193, 194 defined by the axis of link 185 lies below the axis of shaft 191. Thus, the weight of the cradle 177 and the rollers and associated parts lying to the right of shaft 179–180 tends to urge yoke 188 and arm 184 toward and hold them in the full line position and the resulting tension on link 185 holds the rollers raised.

An arm 187 on the carriage 50 is so positioned that as the carriage moves forwardly, it enters the open-ended slot 189 in the yoke 188 and rocks the yoke clockwise to lift the link 185 above the axis of shaft 191, thereby permitting the rollers and cradle 177 to swing downwardly to the position shown in dotted lines. Thereafter, the downward movement of the feed tube is limited only by the offset cradle-supporting portion 177', which prevents undue sagging of the feed tube but permits it to move downwardly to a position such that, as the carriage is tilted upwardly due to the combined effect of the forward sloping section Z and the front rollers, the feed tube tends to assume an angular position more nearly axially parallel to the lance tube, carriage and hub 58, which are now tilted at the angle at which the carriage 50 is shown in FIGURE 1B, thereby preventing any tendency of the feed tube and the carriage and packing to cock with respect to one another, so as to create undue wear and friction, and keeping the feed tube from sliding entirely out of the lance tube, which might occur if undue sagging were permitted. It will be seen that since the front rollers 95, 96 are at an elevated position with relation to the carriage, as the carriage moves forwardly over the depressed section Y, as well as during its travel on the sloping section Z, the angular displacement and depression of the rear portion of the lance tube corresponds to the sagging tendency of the feed tube. Thus, the feed tube tends to remain substantially axially parallel to the hub 58 and packing assembly 52, although limited axial misalignment is accommodated by the form and shiftability of ring 65, as noted above.

Each of the rollers 95, 96 and 175, 176 is preferably journaled in a bracket which is adjustably mounted in the hanger 98 in the case of front rollers 95, 96, and in the cradle 177 in the case of auxiliary support rollers 175, 176. The brackets for the front rollers are designated 200 and those for the auxiliary support rollers are designated 202. As brought out in FIGS. 10 and 11, each bracket is secured to a flat supporting area 204, 205, 206, 208 which, when the rollers are in their operative supporting positions, lies below the supported tube 26 and/or 40, and is parallel thereto but perpendicular to a line radial to the axis of the supported tube. When the rollers are in their regular and centered operative positions, the bracket supporting surfaces 204, 205 of hanger 98 and the corresponding surfaces 206, 208 of cradle 177 lie at 45° to a transverse horizontal line and 90° to each other. Each bracket is attached to its supporting surface by two machine screws, one of which, as 210 (FIG. 12) is positioned midway of the axial length of the roller radially with respect to the roller and the axis of the tube in the roller-supported position of the latter. The other screw, 211, is offset from screw 210 and extends through an arcuate slot 212 in the supporting surface, which slot is concentric with the axis of screw 210. When the screws are loose, the rollers can be turned about the axes of their radial screws 210 to lie parallel to helices of variant pitch. Tightening the screws fastens the rollers in their adjusted positions.

While one commercially practical embodiment of the invention has been described and illustrated herein somewhat in detail, it will be understood that various changes may be made as may come within the purview of the lesser amounts, respectively, the novelty which com- accompanying claims.

What is claimed is:

1. In a long retracting soot blower including telescopically interfitted elongated feed tube and lance tube elements and means for sliding the lance tube element between retracted and projected positions, in which positions it overlaps the feed tube element by greater and lesser amounts, respectively, the novelty which comprises, in combination:
   (A) Auxiliary supporting means positioned adjacent a part of the feed tube element which is overlapped by the lance tube element when the latter is retracted but which is not overlapped by the lance tube element when the latter is projected, and
   (B) means for moving said auxiliary supporting means toward and from two differently laterally spaced underlying positions with respect to said feed tube element to suport both elements against unwanted gravity-induced bowing at one elevation when the lance tube element is retracted and to support the feed tube element at a different elevation when the lance tube element is projected.

2. In a long retracting soot blower including an elongated feed tube and a lance tube slidably overfitted upon the feed tube, carriage means secured to and movable with the feed tube to actuate the latter so that it is movable between retracted and projected positions wherein it overlaps the feed tube by greater and lesser amounts, respectively, the novelty which comprises in combination:
   (A) Auxiliary supporting means positioned adjacent a part of the feed tube which is overlapped by the lance tube when the latter is retracted and which is not overlapped by the lance tube when the latter is projected, and
   (B) Means for moving said auxiliary supporting means laterally with respect to the path of travel of the carriage toward and from an underlying supporting position with respect to the feed tube.

3. A long retracting soot blower as defined in claim 2 wherein said means for moving the auxiliary supporting means is carried by said carriage.

4. A long retracting soot blower as defined in claim 2 including a beam structure comprising a pair of vertical longitudinally extending laterally spaced parallel side walls, said lance tube and feed tube being disposed between said side walls, said auxiliary supporting means being carried by the beam structure.

5. A soot blower as defined in claim 4 including rails carried by the opposed inner surfaces of said side walls, and rollers on opposite sides of the carriage rollably supporting the carriage and lance tube on said rails.

6. A soot blower as defined in claim 5 wherein the beam structure is straight and the rails are inclined and cause the carriage to move bodily both horizontally and vertically when traveling along the rails.

7. A soot blower as defined in claim 6 wherein said rollers comprise a coaxial pair of rollers forming the entire support for said carriage, rack portions also supported by said sidewalls and parallel to said rails, and gear means coaxial with the rollers and meshing with the rack portions for driving the carriage along the rails.

8. A soot blower as defined in claim 7 wherein the beam structure is an inverted channel having side webs defining said side walls and spaced oppositely inturned horizontal bottom flanges, said auxiliary supporting means being carried by said bottom flanges.

9. A soot blower as defined in claim 21 wherein the beam structure is an inverted channel having side webs defining said side walls and spaced oppositely inturned horizontal bottom flanges, said auxiliary supporting means being carried by said bottom flanges and comprising a hanger swingable about a transverse axis and having intermediate supporting portions offset from said axis and movable to different vertically spaced positions by swinging the hanger about said axis.

10. A long retracting sootblower as defined in claim 2 including a beam structure comprising a pair of vertical longitudinally extending laterally spaced parallel side walls, said lance tube and feed tube being disposed between said side walls, said auxiliary supporting means being carried by the beam structure, and actuatable by said carriage means.

11. In a long retracting soot blower including a lance tube adapted to be projected into and retracted from a boiler setting or the like, a straight beam structure having at least three walls for enclosing and supporting the lance tube outside the boiler setting and including a top wall and a pair of spaced parallel side walls, a carriage for actuating the lance tube, means for rollably supporting the carriage including rails attached to the opposed inner surfaces of said side walls and inclined with respect to the beam structure, said means for supporting the carriage including rollers and trunnion means perpendicular to the side walls and connecting the carriage to the rollers while permitting rocking of the carriage about the perpendicular trunnion axis, the clearance between the carriage and the top wall permitting such rocking of the carriage to the extent induced by the inclination of the rails, and means for driving the carriage along the rails.

12. In combination with means as defined in claim 11, rack portions also supported by said side walls and parallel to said rails, said means for driving the carriage reacting against said rack portions, means for supporting the carriage upon said rails comprising a pair of coaxial rollers on opposite sides of the carriage and constituting the entire support for the carriage, the carriage being rockable in vertical planes about the axis of said rollers, said means for driving the carriage including gear means on the carriage coaxial with said rollers.

13. A construction as defined in claim 12 including two pairs of rails, one pair secured to and extending longitudinally along each of said side walls, each pair being defined by vertically spaced parallel rail portions, and rollers disposed between the upper and lower rail portions of each of said pairs of rails, whereby the rollers and carriage are restrained against unwanted bodily movement in a vertical direction but the carriage may rock about the axis of the rollers, the rack portions being carried by one of the rails of each of said pairs of rails.

References Cited
UNITED STATES PATENTS

| | | | |
|---|---|---|---|
| 2,883,694 | 4/1959 | Hibner et al. | 15—317 |
| 3,216,044 | 11/1965 | Chappell | 15—317 |
| 3,216,045 | 11/1965 | McColl | 15—317 |

ROBERT W. MICHELL, *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,439,376

April 22, 1969

John E. Nelson et al.

It is certified that error appears in the above identified patent and that said Letters Patent are hereby corrected as shown below:

Column 9, line 53, cancel "lesser amounts, respectively, the novelty which com-". Column 10, line 45, claim reference numeral "21" should read -- 7 --.

Signed and sealed this 14th day of April 1970.

(SEAL)
Attest:

Edward M. Fletcher, Jr.
Attesting Officer

WILLIAM E. SCHUYLER, JR.
Commissioner of Patents